UNITED STATES PATENT OFFICE.

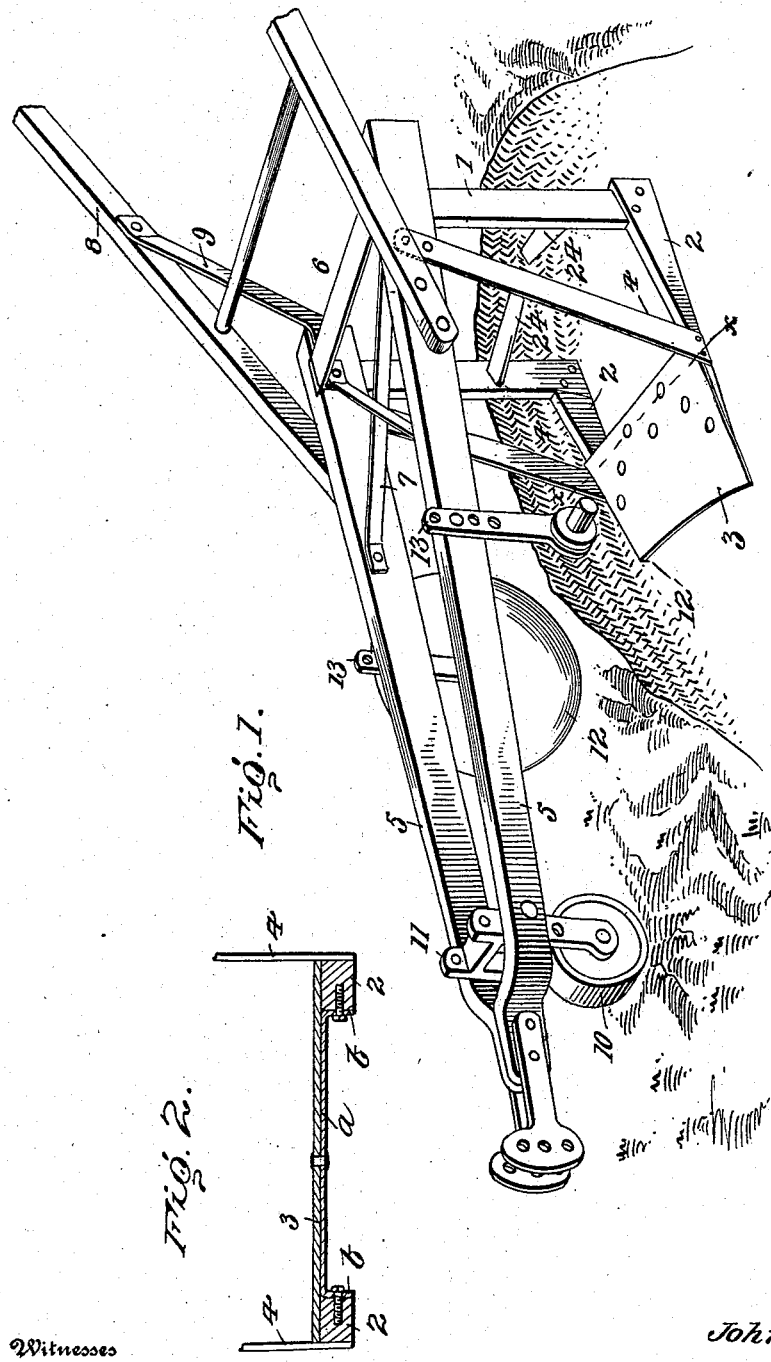

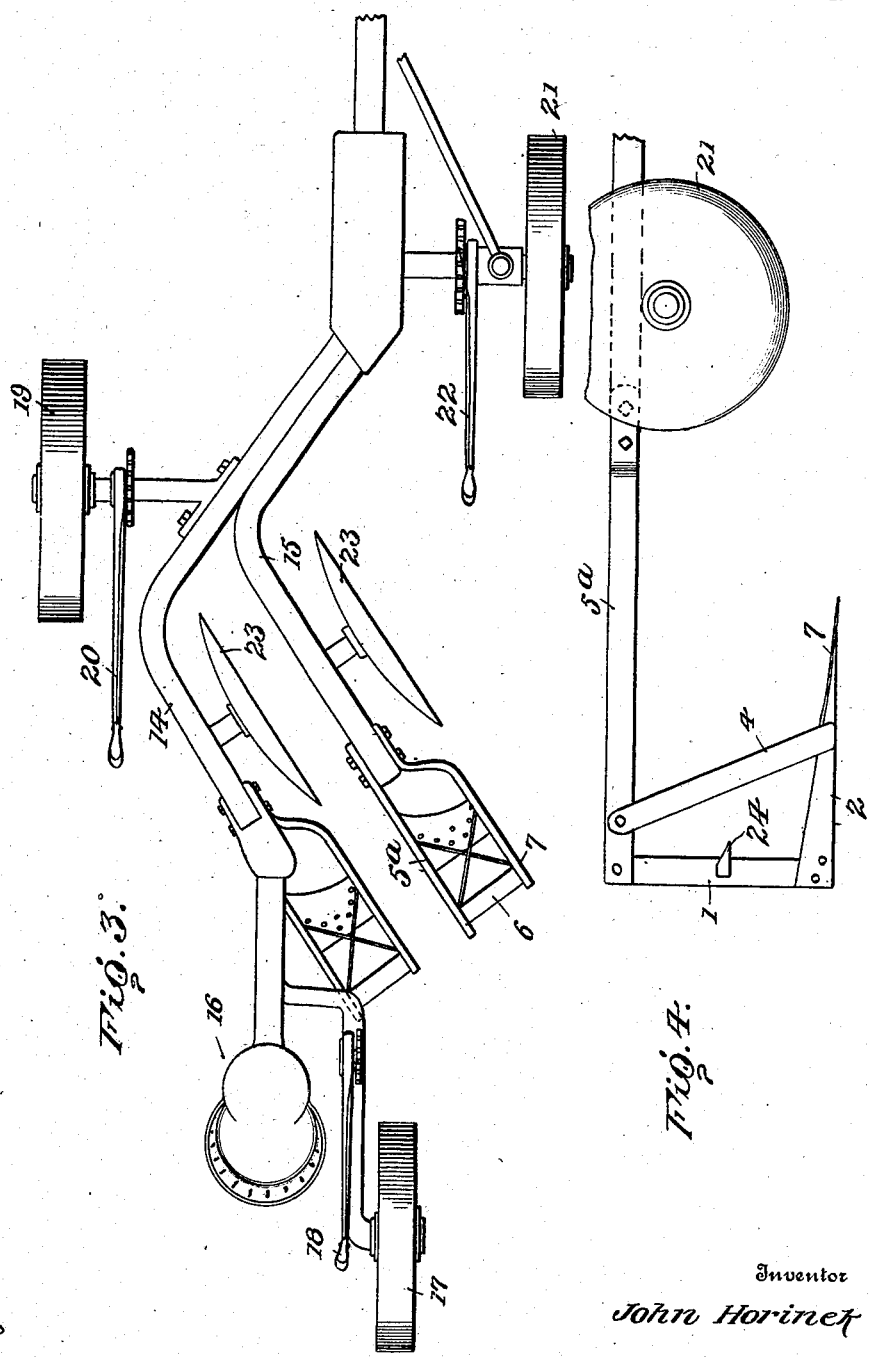

JOHN HORINEK, OF ATWOOD, KANSAS.

CULTIVATOR.

No. 911,876.        Specification of Letters Patent.        Patented Feb. 9, 1909.

Application filed June 3, 1908. Serial No. 436,374.

*To all whom it may concern:*

Be it known that I, JOHN HORINEK, citizen of the United States, residing at Atwood, in the county of Rawlins and State of Kansas, have invented certain new and useful Improvements in Cultivators, of which the following is a specification.

The present invention has relation to lister cultivators and provides a novel form of implement which may be adapted for a variety of work and conditions and which embodies disk cultivators and shovel blades, the parts having a novel arrangement to admit of desired results being effected according to the nature of the work and the character of the soil to be tilled.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of an implement embodying the invention showing the same adapted as a walking cultivator. Fig. 2 is a transverse section on the line x—x of Fig. 1. Fig. 3 is a top plan view of a modification, showing the invention adapted as a riding lister. Fig. 4 is a side view of the machine shown in Fig. 3, parts being omitted.

Corresponding and like parts are referred to in the following description and indicated in all the views of the drawings by the same reference characters.

The implement comprises a pair of standards 1, longitudinal bars 2 connected at their rear ends to the respective standards and tapered throughout their length towards the front and a shovel blade 3 secured to the front ends of the longitudinal bars 2. A plate *a* is placed between the bars 2 and its longitudinal edge portions are bent downwardly as indicated at *b* and secured to the inner sides of the bars 2. This plate *a* reinforces the shovel blade 3 and braces and strengthens the bars 2 and is riveted or otherwise fastened to the shovel blade as indicated most clearly in Figs. 1 and 3. Braces 4 strengthen the front portions of the longitudinal bars 2. When the implement is adapted for a walking lister, the upper ends of the standards 1 and braces 4 are connected to beams 5 which are forwardly converged and have their front ends extended inwardly and provided with a clevis. A cross piece 6 properly spaces the rear ends of the beams 5, the latter being further stayed and strengthened by means of braces 7. Handle bars 8 are connected at their lower ends to the beams 5 and braces 9 strengthen the same. A pilot wheel 10 supports the front ends of the beams 5 and is carried by a frame 11 attached thereto. Cultivator disks 12 are carried by standards 13 which are adjustably connected at their upper ends to the beams 5.

In the construction shown in Fig. 3, the bars 5ᵃ correspond to the beams 5 and have the upper ends of the standards 1 and braces 4 connected thereto, their rear portions being connected by cross pieces 6 and braces 7. The bars 5ᵃ are connected to the rear ends of beams 14 and 15 which are of peculiar formation, being bent intermediate of their ends to throw the latter relatively at an obtuse angle to one another. The front portion of the beams 14 and 15 come together and are secured in any substantial way. The rear ends of said beams are spaced apart to throw the cultivators at a distance from one another. A seat 16 has connection with one of the beams, as 14. The implement is mounted upon wheels 17, 19 and 21 with which levers 18, 20 and 22, respectively coöperate in the usual way to admit of the cultivating devices being adapted to various conditions of soil and work in the manner well understood. Cultivator disks 23 are mounted upon the rear portions of the beams 14 and 15 and operate in advance of the shovel blades 3.

From the foregoing it will be understood that the invention may be readily adapted to a walking implement or to a riding lister and is suited to different conditions of work and surface of the ground. As indicated most clearly in Fig. 1, horizontal cutters 24 project inward from the standard 1 and are designed to cut roots and loosen the soil a short distance below the surface and at a point above the plane of the shovel blade 3.

Having thus described the invention, what is claimed as new is:

1. In an implement of the character described, the combination of transversely spaced standards, tapered bars projected forwardly from the lower ends of the standards, a shovel blade secured to the forward ends of said tapered bars, and a plate placed beneath the shovel blade and secured thereto and having its longitudinal edge portions downwardly bent and connected to the inner sides of said longitudinal bars.

2. In an implement of the character specified, the combination of spaced beams, standards attached to said beams, tapered longitudinal bars projected forwardly from the lower ends of said standards, a shovel blade attached to the forward ends of said longitudinal bars, braces between the forward ends of said longitudinal bars and the said beams, and other braces between the said beams.

3. An implement comprising transversely spaced beams, braces between the beams, standards connected at their upper ends to the said beams, tapered longitudinal bars projected forward from the lower ends of the standards, a shovel blade attached to the forward ends of said tapered longitudinal bars, a plate placed beneath the shovel blade and attached thereto and to the said longitudinal bars, braces between the forward ends of the longitudinal bars and the beams, and cutters extended inward from the said standards and located in a higher plane than the shovel blade.

In testimony whereof I affix my signature in presence of two witnesses.

JOHN HORINEK. [L. S.]

Witnesses:
W. N. WOODSON,
V. B. HILLYARD.